March 4, 1958     T. HINDMARCH     2,825,235
POWER TRANSMISSION MECHANISM
Filed Feb. 1, 1954
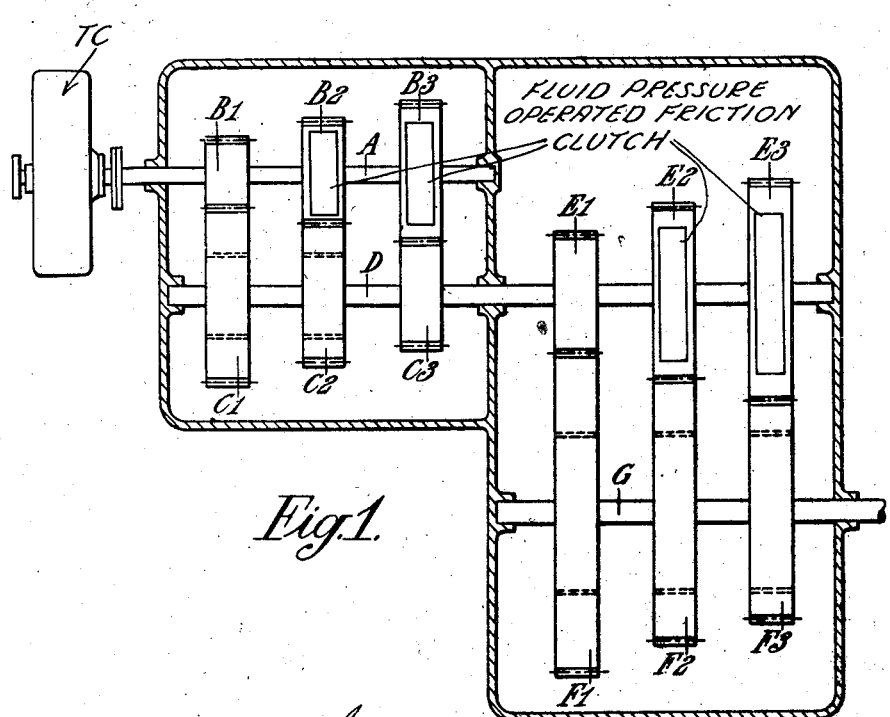
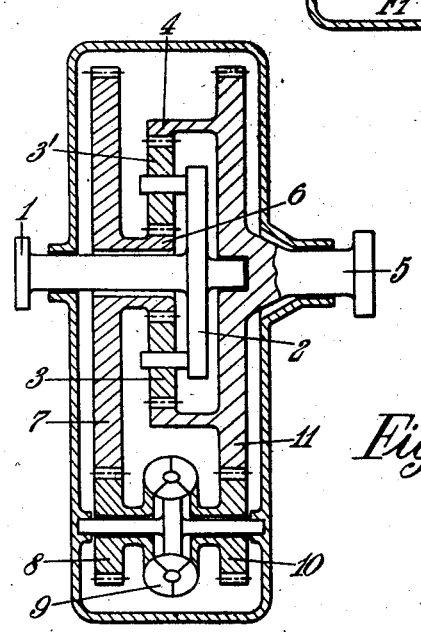
Inventor
T. Hindmarch

United States Patent Office 2,825,235
Patented Mar. 4, 1958

2,825,235

POWER TRANSMISSION MECHANISM

Thomas Hindmarch, Chesham, England

Application February 1, 1954, Serial No. 407,440

Claims priority, application Great Britain
February 3, 1953

5 Claims. (Cl. 74—368)

This invention relates to change speed gears particularly for heavy vehicles and for industrial purposes.

In the case of heavy vehicles such as locomotives, railcars and road vehicles carrying a heavy load, driven for example by diesel engines it is necessary to provide change speed gear boxes having a large number of speed ratios in order that full engine power may be used at different road speeds, but even so, the drive between the prime mover and the driving wheels is normally interrupted when a change is made from one ratio to another, resulting in interrupted application of torque and consequent jolting and wear.

The object of the present invention is to provide a change speed mechanical transmission with continuous drive and free from shock when passing from one speed to the next.

The invention consists in a change ratio power transmission unit having alternative paths for the drive and affording different speed ratios between an input and output shaft, and in which in at least one and preferably two pairs of alternative paths the path having a lower speed ratio includes a free wheel while the path having a higher speed ratio includes a friction clutch, so that, upon engagement of the clutch the drive is transferred from the path having the lower speed ratio to the path having the higher speed ratio, with the resultant disengagement of the free wheel, without interrupting the drive.

The invention further consists in that two or more units as set forth in the preceding paragraph are connected in series.

The following description is partcularly directed to a specific arrangement of a nine-speed gear box which is adaptable for use in locomotives, rail cars and heavy road vehicles, but it is to be understood that the invention is not limited to such a construction as it is equally applicable for example to the simplest form of three or four speed gear box for a light car where the feature of uninterrupted drive is also of importance, in which it adds materially to the comfort of travel and efficiency of engine performance.

The accompanying drawings show diagrammatically by way of example only, one form of construction in accordance with the invention in which:

Figure 1 is a section through a gear box, and
Figure 2 is a section through a torque converter particularly but not exclusively adapted for use with the gear box of Figure 1.

Power is fed from a prime mover by way of a torque convertor JC and isolating clutch (not shown) into driving shaft A on which are located three pinions $B^1$, $B^2$, $B^3$, two of which carry clutches, preferably but not necessarily of the kind incorporated in the pinions. These pinions, the lowest gear of which $B^1$, does not require a clutch, are in constant engagement with pinions $C^1$, $C^2$ and $C^3$ located on secondary shaft D. Pinions $C^1$ and $C^2$ have free wheels incorporated therein. This is the first part of the nine-speed unit, and the method of functioning is as follows:

In bottom gear the clutches $B^2$ and $B^3$ are disengaged so that the drive is conveyed through pinion $B^1$ to pinion $C^1$ which, being attached through a free wheel to shaft D, conveys the drive to D, the driven shaft. When it is desired to engage the next higher gear, the clutch in the pinion $B^2$ is engaged and the drive is then transmitted through $B^2$ to $C^2$ and thence to D. At this point, since pinion $C^1$ has a free wheel, this pinion can run slower than pinion $C^2$ allowing the shafts A and D to run at their respective speeds by reason of the drive by way of pinions $B^2$ and $C^2$ while the drive through $B^1$, $C^1$ has then ceased to operate, since the inner part of the free wheel in $C^1$ has in fact run away from the outer part.

When the next higher gear requires to be engaged, the clutch in pinion $B^3$ is then engaged without the necessity for disengagement of clutch $B^2$. The drive in the higher gear is then carried from $B^3$ to $C^3$, and thence to driven shaft D and the inner part of the free wheel in pinion $C^2$ now overruns the outer part.

It will therefore be observed that from a standing start the power is transmitted from a prime mover through an isolation clutch to the input shaft A. The gear box is then caused to operate in bottom gear. The isolation clutch need not be interfered with thereafter, but may remain in constant engagement, and when sufficient velocity has been achieved on the first gear $B^1$, $C^1$, to permit of change to the second gear $B^2$, $C^2$, the clutch $B^2$, $C^2$ takes up the drive without $B^1$, $C^1$ having to be disconnected. The same process is then repeated in passing from second to the third gear. This is particularly important when this drive is employed, for example, in a locomotive on a gradient pulling a heavy train load. Change into the second gear can be effected without interruption of draw-bar pull, and therefore without any consequential loss of momentum.

The simple three-ratio box just described and forming the first stage in the full nine-ratio box can of course be used alone with advantage in the case of a light car.

In the second stage of the nine-ratio box the shaft D now becomes the driving member of a similar assembly, namely $E^1$, $E^2$ and $E^3$ driving on to pinions $F^1$, $F^2$ and $F^3$, and clutches are incorporated in $E^2$ and $E^3$ and free wheels incorporated in $F^1$ and $F^2$.

The free wheel shown in pinion $F^3$ is not necessary for the proper operation of the gear box but may be provided so that the vehicle may overrun the prime mover without hindrance when running down a slope. The sequence of engagement follows the same course as described for the first stage. The final driven shaft is now designated as shaft G and carries aforesaid pinions $F^1$, $F^2$ and $F^3$.

These gears are then operated sequentially in like manner, and a total number of nine ratios altogether are thereby obtainable.

The sequence of engagement from stationary up to the ninth or top gear is as follows:

*Bottom gear.*—Clutches $B^2$, $B^3$, $E^2$, $E^3$ are disengaged. The isolation clutch attached to the prime mover is engaged. The drive then proceeds through the following parts: prime mover, isolation clutch, shaft A, pinion $B^1$, pinion $C^1$, shaft D, pinion $E^1$, pinion $F^1$ to shaft G.

*Second gear.*—From prime mover via isolation clutch, shaft A, pinion $B^2$, pinion $C^2$, shaft D, pinion $E^1$, pinion $F^1$ to shaft G.

*Third gear.*—From prime mover via isolation clutch, shaft A, pinion $B^3$, pinion $C^3$, shaft D, pinion $E^1$, pinion $F^1$ to shaft G.

*Fourth gear.*—From prime mover via isolation clutch, shaft A, pinion $B^1$, pinion $C^1$, shaft D, pinion $E^2$, pinion $F^2$ to shaft G.

*Fifth gear.*—From prime mover via isolation clutch, shaft A, pinion $B^2$, pinion $C^2$, shaft D, pinion $E^2$, pinion $F^2$ to shaft G.

*Sixth gear.*—From prime mover via isolation clutch, shaft A, pinion $B^3$, pinion $C^3$, shaft D, pinion $E^2$, pinion $F^2$ to shaft G.

*Seventh gear.*—From prime mover via isolation clutch, shaft A, pinion $B^1$, pinion $C^1$, shaft D, pinion $E^3$, pinion $F^3$ to shaft G.

*Eighth gear.*—From prime mover via isolation clutch, shaft A, pinion $B^2$, pinion $C^2$, shaft D, pinion $E^3$, pinion $F^3$ to shaft G.

*Ninth gear.*—From prime mover via isolation clutch, shaft A, pinion $B^3$, pinion $C^3$, shaft D, pinion $E^3$, pinion $F^3$ to shaft G.

It will be observed that sequential engagement of each clutch higher respectively in the $B^1$, $B^2$, $B^3$ series and following up through the $E^1$, $E^2$, $E^3$ series is such that there is no interruption of torque at any point, so that while the draw-bar pull may vary slightly from gear to gear, there is no cessation of draw-bar pull from the first engagement of the isolation clutch.

In similar manner, when a gradient is reached, and the velocity of the train or of the vehicle diminishes through overload, the sequential disengagement of the clutches is again done without interruption of draw-bar pull. It can be noted that when the train or vehicle is being retarded in velocity because of overload the draw-bar pull on the next lower gear can be arranged to be at its maximum at the time of engagement, which is highly beneficial for the maintenance of velocity.

It will be observed that these two systems may be in one box, shaft D, the driven member of the first system, being the driving member of the second, or, alternatively, the two series may be separated into two boxes, and a coupling interposed between the driven member of one and the driving member of the next.

In my preferred arrangement I incorporate internal fluid-operated clutches, but the invention is not restricted to fluid-operated clutches. The clutches may be either attached alongside the pinions or within them, or situated in any convenient position.

It can now be appreciated that the advantages of my gear are not only that uninterrupted drive is possible throughout the range of torque provided, but that despite the large number of gear ratios only a small number of clutches is necessary and these clutches may be of the same size. Also there is no excessive speed difference between the clutch elements on disengaged gears. Furthermore, the invention allows of the easy application of automatic controls to changing gears by a large variety of methods not only hydraulic, while the arrangement allows of the production of a very compact design.

It will be appreciated that a free wheel or like device is never required in $C^3$ when this is on an intermediate shaft, and that, similarly, the free wheel is only required in the pinion $F^3$ when a fully free wheel drive is required.

Similarly, no engagement clutch is required on pinion $F^3$ when this is on an intermediate shaft and that a friction or like engagement clutch may be incorporated in association with the pinion $B^1$, where no other form of isolation clutch is used.

While this invention has been described in particular to road and rail vehicles, it will also be applicable to many industrial problems such as rolling mills, machine tool drives and other problems where widely different velocities are required.

It will be observed that this part of my invention as described requires that the drive shall be taken in a series of steps. In place of the isolation clutch or in addition thereto, I therefore propose incorporating optionally a torque converter by which means the drive will be continuous and smoothly variable throughout the whole speed range. For example, if the torque converter is capable of a speed range of just above, to about 30% below, the input revolutions, and if my change speed gears alter in ratio by an amount of, say 25%, then the torque variations from gear to gear will be smoothed out by the torque converter and the graph of the tractive effort will be smooth and without steps.

The following description therefore is directed to a torque converter which is particularly suitable for use in the manner above referred to, but as is obvious from the description it is to be understood that both the stepped change ratio mechanism and the torque converter can be incorporated in the vehicle or machine separately and independently where desired.

Hydrodynamic torque converters having three or more elements have generally a poor overall efficiency. A fairly common figure is about 80% over the designed working range, while outside this range the efficiency is generally much lower. While this efficiency can, in some cases, be improved over a limited range, it is generally at the expense of other features such as size and cost.

My limited range torque converter is smaller and less expensive and has a higher figure of efficiency than a full range torque converter. I insert it before the multi ratio transmission and thus achieve a gradual variable transmission without steps.

The invention consists in a transmission unit comprising a differential or epicyclic type gear unit having three elements in which one element is adapted to be driven directly or indirectly by the prime mover or other source of power, a second element is adapted to drive the input of the change ratio power transmission, while the third element drives the input of a torque converter the output of which also drives the input of the change ratio power transmission unit.

The invention further consists in a construction as set forth in the preceding paragraph in which a lesser proportion of the total torque transmitted passes by way of the torque converter.

In the construction illustrated in Figure 2 by way of example only, an input shaft 1 drives the carrier 2 on which are carried the planet wheels 3, 3' of an epicyclic gear system. The outer gear 4 is attached to the output shaft 5, and the sun wheel 6 drives via gear 7 and 8 the input element of a three or more element hydrodynamic torque converter 9. The output element of which also drives the output shaft 5 through gears 10 and 11.

It will be observed that a portion of the input torque is transmitted to the output shaft directly through the gearing while the remainder is transmitted through the torque converter—the proportion being determined by the ratios chosen for the various gears. Thus, if the ring wheel 4 has three times the number of teeth of the sun wheel 6, three quarters of the torque will be transmitted through the gearing and a quarter through the torque converter. The torque converter itself may be arranged to be driven at a higher speed than the input shaft, thus reducing its size and cost.

It will be observed, also, that as the speed of the output shaft drops due to increase in the output load, the sun wheel, and consequently the input element of the torque converter, will increase in speed. This compensates for the fact that although the torque input to the torque converter remains constant the power transmitted through the torque converter increases with increasing slip. In general, for a given size of torque converter the power transmitted and the efficiency will increase with increase of speed, and consequently my arrangement permits of the use of a torque converter which is very economical, both in size and cost.

It will be noticed that as only a portion of the power is being transmitted by the torque converter the losses in this part of the unit only apply to that proportion of the power, i. e. in the case quoted above, if the efficiency of the torque converter itself is 80% and it carries a quarter of the power, the overall efficiency of the transmission will be 95% (ignoring the losses in the gearing which can be made very small).

It will now be appreciated that while the stepped multi-ratio gear transmission mechanism and the torque converter transmission unit having a continuously variable ratio gear each can be used along with great advantage, they are complementary in as much that they can be used together with added advantage.

The forms of construction hereinbefore described are by way of example only and various modifications of the arrangement and disposition of the various parts may be made to suit different conditions and details for carrying the invention into effect may be varied without departing from the scope of the invention.

I claim:

1. Change ratio power transmission unit comprising an input shaft, an output shaft parallel to the input shaft, a plurality of pinions of different diameters on the input shaft, a plurality of pinions on the output shaft each engaging one of the pinions on the input shaft, the smallest pinion on each shaft being rigidily connected thereto while the remaining pinions are mounted for rotation upon their respective shafts, a friction clutch associated with each pinion mounted for rotation on the input shaft for drivingly connecting the same with said shaft, and a free wheel associated with each pinion mounted for rotation on the output shaft by means of which the output shaft may be driven by the said pinions in one direction only.

2. Change ratio power transmission unit comprising an input shaft, an output shaft parallel to the input shaft, three pinions of different diameters on the input shaft, three pinions on the output shaft engaging the pinions on the input shaft, the smallest pinion on each shaft being rigidly connected thereto, while the remaining pinions are mounted for rotation on their respective shafts, a fluid pressure operated friction clutch associated with each pinion mounted for rotation on the input shaft drivingly connecting the same with said shaft and a free wheel associated with each pinion mounted for rotation on the output shaft by means of which the output shaft may be driven by the said pinions in one direction only.

3. Change ratio power transmission unit comprising an input shaft, and output shaft parallel to the input shaft, a plurality of pinions of different diameters on the input shaft, a plurality of pinions on the output shaft each engaging a pinion on the input shaft, the smallest pinion on the input shaft being rigidly connected thereto while the remaining pinions are mounted for rotation on their respective shafts, a fluid pressure operated friction clutch within each pinion mounted for rotation on the input shaft for drivingly connecting the same with said shaft and a free wheel within each pinion mounted for rotation on the output shaft by means of which the output shaft may be driven by the said pinions in one direction only.

4. Change ratio power transmission unit comprising an input shaft, a torque converter driving the input shaft, an output shaft parallel to the input shaft, a plurality of pinions of different diameters on the input shaft, a plurality of pinions on the output shaft each engaging a pinion on the input shaft, the smallest pinion on each shaft being rigidly connected thereto while the remaining pinions are mounted for rotation on their respective shafts, a friction clutch associated with each pinion mounted for rotation on the input shaft for drivingly connecting the same with said shaft, and a free wheel associated with each pinion mounted for rotation on the output shaft by means of which the output shaft may be driven by the said pinions in one direction only.

5. Power transmission unit comprising a close-ratio change ratio gear comprising an input shaft, an output shaft, a system of interengaging toothed wheels providing at least two alternative paths of different speed ratios for a drive between said input shaft and output shaft, a free wheel in the path having the lower speed ratio in any pair of paths and a friction clutch in the path having the higher speed ratio in the same pair of paths and a torque converter of limited torque range driving said gear by way of the input shaft, the range of the torque converter being chosen such as to give an uninterrupted traction drive throughout the speed range of the gear.

References Cited in the file of this patent

UNITED STATES PATENTS

| | | |
|---|---|---|
| 1,230,659 | Breed | June 19, 1917 |
| 1,910,320 | Bullock | May 23, 1933 |
| 2,056,365 | Raven et al. | Oct. 6, 1936 |
| 2,248,240 | King | July 8, 1941 |
| 2,440,588 | Kegresse | Apr. 27, 1948 |
| 2,466,318 | Kohr | Apr. 5, 1949 |
| 2,694,937 | Birbaum | Nov. 23, 1954 |